United States Patent [19]
Johnson

[11] 3,737,586
[45] June 5, 1973

[54] TIME DIVISION SWITCHING SYSTEM

[75] Inventor: Glover Douglas Johnson, Naperville, Ill.

[73] Assignee: Bell Telephone Laboratories, Incorporated, Murray Hill, N.J.

[22] Filed: Oct. 1, 1971

[21] Appl. No.: 185,749

[52] U.S. Cl. .............................................. 179/15 AQ
[51] Int. Cl. .................................................. H04j 3/00
[58] Field of Search ........................ 179/15 A, 15 AQ

[56] References Cited

UNITED STATES PATENTS

| | | | |
|---|---|---|---|
| 3,458,659 | 7/1969 | Sternung | 179/15 AQ |
| 3,617,643 | 11/1971 | Nordquist | 179/15 AQ |
| 3,632,883 | 1/1972 | Aagaard | 179/15 AQ |
| 3,644,679 | 2/1972 | Tallegas | 179/15 AQ |

FOREIGN PATENTS OR APPLICATIONS

| | | | |
|---|---|---|---|
| 6,376 | 4/1966 | Japan | 179/15 AQ |

*Primary Examiner*—Ralph D. Blakeslee
*Attorney*—W. L. Keefauver

[57] ABSTRACT

A toll telephone switching system for switching PCM data among time division multiplex lines is disclosed. The system comprises a time-shared space division network and interface circuits which buffer incoming PCM data and distribute the incoming data from a group of multiplex lines over a group of input ports of the network. The interface circuits also buffer outgoing PCM data at the output side of the network and distribute the data from a group of output ports of the network over a group of output multiplex lines.

6 Claims, 5 Drawing Figures

FIG. 2 INPUT

OUTPUT

TIME SHARED SPACE DIVISION NETWORK

TIME DIVISION SWITCHING SYSTEM

CROSS REFERENCE TO RELATED APPLICATION

This application is related to the application of G. D. Johnson et al. case 4-3-1-9 entitled "Time Division Switching System", which is being filed concurrently with the present application, and is assigned to Bell Telephone Laboratories, Incorporated, the assignee of the present application.

BACKGROUND OF THE INVENTION

The invention relates to a time division switching system for switching multiplexed data. The invention more particularly relates to a toll telephone system for switching PCM (pulse code modulated) data amoung time division mulitplex lines.

It is the function of the telephone switching system to establish communication paths between calling lines or trunks and called lines or trunks. Systems are known in the prior art in which analog signals from a plurality of lines or trunks are converted to PCM data words and are multiplexed onto a single transmission line having a plurality of channels. Such a channel is an identifiable time period on the transmission line which occurs once in each time frame of the line. Known prior art systems typically have 24 channels per time frame and speech information from 24 independent lines or trunks is transmitted during each time frame. PCM information may be switched among multiplex lines by selectively transferring PCM data words from the various channels of an input multiplex line to a plurality of output multiplex lines. The transfer of data words from input multiplex lines to output multiplex lines may be accomplished by means of a multistage space division network which is reconfigured at a predetermined rate compatible with the rate at which the data is received from input multiplex lines.

It is known that severe blocking problems can occur in time-shared space division networks. Some techniques for overcoming such blocking are also known. One technique is to provide a nonblocking time division network having a cycle time which is one-half of the duration of a frame of the multiplex lines. Thus, to serve multiplex lines having $n$ channels per frame, the network must have $2n$ time slots during a period of time which is equivalent to one frame. Due to advances in the art, the operational rate of the multiplex lines has been increased to such an extent that the production of a time division network which is reconfigured twice for each channel becomes economically prohibitive if not infeasible by present day technology. Another technique for overcoming blocking in time-shared space division networks is to provide a nonblocking network on which each input multiplex line is given two appearances on the network. It is clear that such an arrangement becomes impractical in large systems due to the high cost of the network. Furthermore, it is known that networks having predetermined blocking characteristics can be built and that such networks are considerably less expensive than nonblocking networks. In large systems, for example, systems having over 1,000 input multiplex lines and a corresponding number of output multiplex lines, the economic advantage gained by using such a less expensive blocking network is substantial.

SUMMARY OF THE INVENTION

It is an object of this invention to reduce blocking in a time division switching system employing a time-shared switching network having known blocking characteristics.

It is a further object of this invention to adjust the traffic load applied to each port of a time-shared switching network to the highest level of port occupancy which the network is designed to handle without blocking.

In accordance with this invention the blocking problem in a system employing a time-shared network for switching digital data among time division multiplex lines is alleviated by distributing the traffic from a group of input multiplex lines having varying traffic loads over a group of network input ports. In large telephone systems it is to be expected that the traffic load carried on voice frequency trunks will vary from trunk to trunk. Similarly, the traffic load on time division multiplex lines which carry traffic from a plurality of voice frequency trunks can also be expected to vary from line to line. By grouping multiplex lines of varying traffic loads and distributing the traffic of a group of lines over a group of network input ports, an averaging effect takes place. Therefore, even where some of the multiplex lines have a nearly 100% occupancy, the traffic from such lines can be averaged with traffic from lines of lesser occupancy. Thus, the traffic load applied to the input ports of the network will be less than 100% occupancy. Hence, a switching network having a predetermined blocking probability can be employed. Additionally, with the passage of time, the traffic on some multiplex lines can be expected to increase and on others it can be expected to decrease. In the system of this invention, the impact resulting from such variations is diminished since the only impact which is felt in the switching office is an increase or decrease in the average traffic load of groups of multiplex lines. Furthermore, in accordance with this invention, the traffic load from a group of input multiplex lines having considerably lower occupancy than the port occupancy which the network can handle without blocking may be distributed over a smaller group of input ports, thereby raising the occupancy of the ports to a level higher than that of the input multiplex lines. Similarly, where the occupancy of a group of input multiplex lines is known to be higher than the allowed port occupancy, traffic from a group of input multiplex lines may be distributed over a larger group of network ports, thereby lowering the port occupancy to a level below that of the input lines.

In one embodiment of this invention a plurality of buffer memories are uniquely associated with each input time division multiplex line and all data words received from the line are distributed to the associated buffer memories in a predetermined sequence. One buffer memory of each line of a predetermined group is given access to one of a group of input ports. All data words from the input multiplex lines are transferred to the associated buffer memories under control of pulses which are derived directly from time slot clock pulses independent of control by the central processor of the system. The transfer of the data words from the buffer memories to the network ports takes place under control of time slot memories which contain information derived by the central processor and which are specifically calculated to transfer information during a time slot in which an appropriate path has been established through the network. A concentration or expansion from the input multiplex lines to the input ports may be readily accomplished by selection of the number of buffer memories which are given access to each port.

DESCRIPTION

Figure 1:
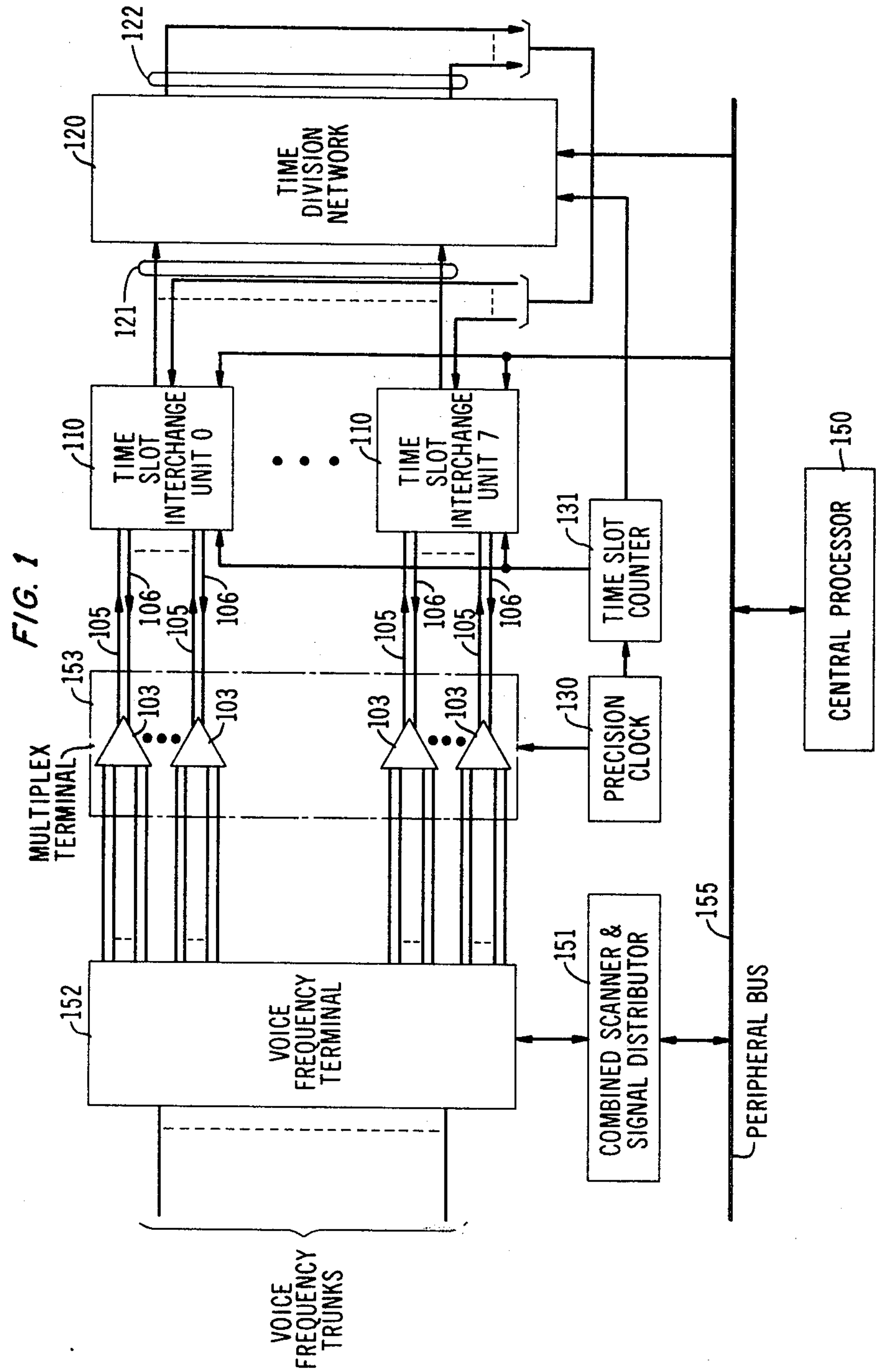
FIG. 1 is a block diagram representation of a toll telephone switching system which serves to illustrate the invention.

The function of the illustrative toll telephone system is to selectively establish communication paths between communication lines which extend from the toll office to other telephone offices. These communication lines may be voice frequency trunks carrying analog signals or multiplex lines carrying digital data. The illustrative system described herein is equipped to convert voice frequency information to multiplex data words. The system comprises a terminal frame 152 to which voice frequency trunks are connected. Some of these voice frequency trunks may be the well-known two-wire trunks and others may be four-wire trunks. The terminal frame 152 comprises circuits which convert all two-wire trunks into four-wire trunks having an incoming pair and an outgoing pair. Thus, the switching portion of the system handles only four-wire trunks. The system further comprises a plurality of multiplex circuits 103 and each multiplex circuit can have both the incoming and outgoing pairs of as many as 128 voice frequency trunks connected thereto. Each multiplex circuit 103 comprises an analog-to-digital converter and a digital-to-analog converter. The analog-to-digital converter samples the analog signals occurring on each incoming pair once during each 125 microsecond time period which is referred to herein as one frame. Each 125 microsecond frame is divided into 128 time periods, referred to herein as channels, and each incoming pair connected to a multiplex circuit is uniquely assigned to one of the channels. The analog-to-digital converter converts each analog sample to a multibit digital data word. The number of bits used to represent a sample may vary with the multiplex mode employed. In this specification it will be assumed that each sample is encoded into an eight-bit digital word. However, it is understood that the number of bits used is not material to our invention. The digital data words are transmitted serially from a multiplex circuit 103 to a corresponding time slot interchange unit 110, by means of an input multiplex line 105. Each time slot interchange unit 110 comprises an input section and an output section and data words are stored in the input section of the time slot interchange unit as they are received from an input multiplex line 105. Subsequently the data words are transferred by means of the network 120 to the output section of the same or an other time slot interchange unit. From the output section of each time slot interchange unit the digital data words are transmitted to the multiplex circuits 103 by means of the output multiplex lines 106. A digital-to-analog converter in each multiplex circuit 103 converts the digital data words occurring on the associated output multiplex line to analog signals. Each signal is applied to the outgoing pair of the voice trunk which corresponds to the channel on the output multiplex line 106 in which the digital word was transmitted.

The multiplex circuits 103 receive timing pulses from the precision clock 130, which is shown in FIG. 1, to generate the 128 channels in each 125 microsecond frame. The precision clock 130 also supplies timing pulses to the time slot counter 131 which in turn supplies time slot pulses to the control circuits of the network and the time slot interchange units. Thus, the timing of the multiplex circuits and of the switching portion of the system are derived from a common source. The time slot counter 131 supplies 128 time slot pulses during each 125 microsecond cycle and additionally supplies certain pulses representing a plurality of time slots. The transfer of digital data words from the input section of a time slot interchange unit through the time-shared network to the output section of the same or another time slot interchange unit is controlled by information stored in a plurality of time slot memories. Information is read from the time slot memories in response to time slot pulses supplied by the time slot counter 131 and a new set of transfer paths is established in the network during each successive time slot. Information is written into the time slot memories by the central processor 150 via the peripheral bus 155. The central processor 150 may be any known data processing machine capable of communicating with the telephone equipment of this illustrative system and capable of making various calculations and translations necessary for the control of the system. A processor having such general capability is described in *The Bell System Technical Journal*, Volume XLIII, September 1964, Number 4, Part 1, pages 1845 to 1923. In the illustrative system, the central processor communicates with a peripheral unit referred to herein as the combined scanner and signal distributor 151. This unit autonomously scans all the trunks having an appearance on the terminal frame 152 for changes in supervisory states, and receives signaling information from the trunks. The combined scanner and signal distributor 151 communicates with the central processor 150 via the peripheral bus 155 and is responsive to commands from the central processor 150 to relay information to the processor and to transmit signaling information on the trunks.

The operation of the illustrative system may be better understood by means of a brief discussion of a sample call. The combined scanner and signal distributor 151 continuously scans the trunks for requests for service and, upon detection of such a request, passes this information, including information identifying the trunks requesting service, to the central processor 150. Upon command from the central processor, the combined scanner and signal distributor begins to scan for incoming call signaling information, which is subsequently passed on to the central processor. The central processor interprets the signaling information to identify the central office which is desired to be reached and selects an available trunk to that central office. By translation of the calling trunk identity information the central processor determines the identity of the time slot interchange unit, as well as the buffer memory locations associated with the calling trunk. Similarly, by translation of the called trunk identity information (i.e., the selected trunk to the called office), the central processor determines the identity of the time slot interchange unit and the buffer memory location associated with the called trunk. Information is transferred between the input and output buffer memories and the multiplex lines in response to clock pulses and without control of the central processor. The central processor further selects two idle network paths in one of the 128 time slots. One path is needed to transfer PCM data from the network input port associated with the calling trunk to the output port associated with the called trunk, and the other path is used to transfer PCM data from the input port associated with the called trunk to the output port associated with the calling trunk. Furthermore, the central processor computes the necessary signaling information to be transmitted on the called trunk to the distant office and transmits this information to the combined scanner and signal distributor 151. After the necessary acknowledge signals have been received from the destination office, the central processor computes, and transmits to the appropriate time slot memories, the information necessary to transfer the incoming samples from the specified input buffer memory locations through the network to the specified output buffer memory locations. Thereafter, a sample originating from the calling trunk is transferred to the called trunk, and vice versa, once every 125 microseconds.

Figure 2:
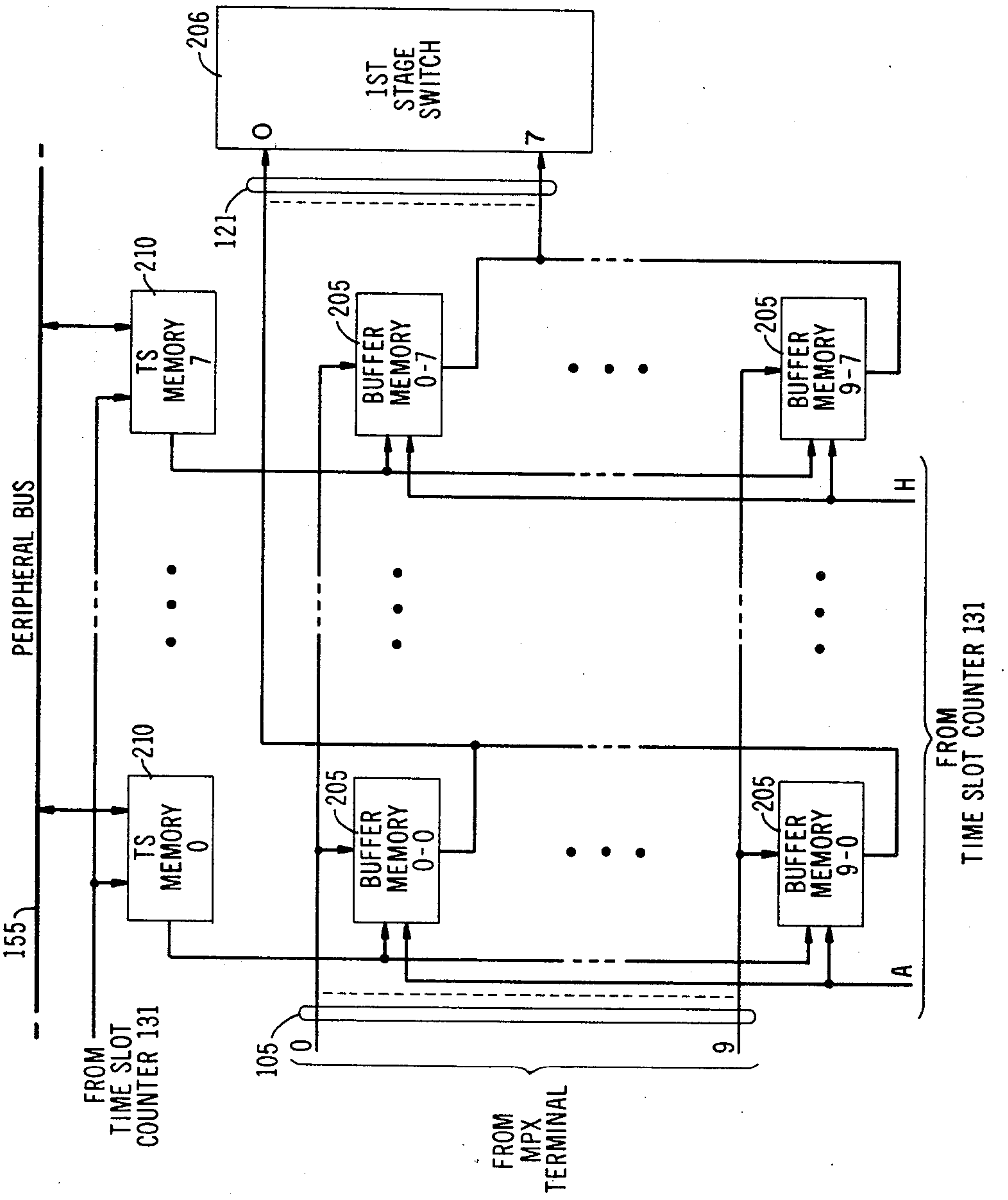
FIGS. 2 and 3 show in greater detail a time slot interchange unit of the illustrative system which comprises a specific embodiment of the invention.

The time slot interchange units 110 will now be discussed in greater detail with reference to FIGS. 2 and 3. FIG. 2 represents the input portion of a time slot interchange unit. In this illustrative arrangement, traffic from a group of ten input multiplex lines 105 is applied to eight network input ports 121. Eight input buffer memories are associated with each input multiplex line 105. FIG. 2 further shows a first stage switch 206 which is part of the time-shared network which is shown in its entirety in FIG. 4. In FIG. 2, the ten input multiplex lines are labeled 0 through 9 and the eight network input ports are labeled 0 through 7. Each of the input buffer memories 205 is labeled with a designation *m–n*, where *m* refers to the input multiplex line from which data is received and *n* refers to the input port to which data is transmitted from the memory. For example, buffer memory 9–7 receives input data from input multiplex line 9 and data from this memory is transmitted to input terminal 7.

The input buffer memories may be any known type of memory. Each input buffer memory must be capable of receiving and storing data words in sequence in response to a write signal, and be capable of random access readout in response to a read signal which specifies the location to be read. From each input multiplex line incoming data words are distributed to the eight input buffer memories associated with the line under control of signals on eight control leads labeled A through H in FIG. 2. Each frame of a multiplex line of the illustrative system comprises 128 channels and each channel may carry one digitally encoded sample of an analog signal or an idle channel code. The signals appearing on control leads A through H are generated by the time slot counter 131 indepedent of control by the system's central processor and all incoming data words, whether they represent encoded samples or idle channel codes, are stored in the buffer memories. The relationship between the control signals on leads A through H and the system's 128 time slots is represented in Table A.

TABLE A

A = time slot 0, 8, 16 – 120
B = time slot 1, 9, 17 – 121
C = time slot 2, 10, 18 – 122
D = time slot 3, 11, 19 – 123
E = time slot 4, 12, 20 – 124
F = time slot 5, 13, 21 – 125
G = time slot 6, 14, 22 – 126
H = time slot 7, 15, 23 – 127

From Table A it can be seen that only one of the eight control leads is active during each time slot. From FIG. 2 it can be seen that control lead controls one memory of each of the ten input multiplex lines. Thus, in each of the 128 time slots one data word is transferred from each multiplex line to one of its associated buffer memories. For example, during time slots 0, 8, 16, etc., control lead A is active and one data word will be gated into each of the buffer memories 0–0 through 9–0 during those time slots. Similarly, during time slots 7, 15, 23, etc., a control lead H is active and one data word will be gated into each of the buffer memories 0–7 through 9–7 during those time slots.

One buffer memory of each of the ten lines is uniquely associated with each of the eight input ports to which the traffic from the 10 lines is to be applied. As explained earlier herein, data words from the input lines are continuously being transferred to the buffer memories under control of clock pulses, independent of whether they represent idle codes or encoded samples. However, only those data words which must be switched through the system are transferred from the input buffer memories 205 to the network input ports 121 and this is accomplished under control of time slot memories 210. One time slot memory is associated with each of the eight input ports and this time slot memory controls the transfer from ten buffer memories to the associated input port. The time slot memories 210 each comprise 128 locations and are thus capable of accomplishing a transfer in each time slot. One word of information is read from each of the time slot memories 210 during each time slot to perform the desired data transfers from the buffer memories 205 to the network input ports 121. The information which is stored in the time slot memories 210 is derived by the central processor 150 from call processing information. The information is transmitted to the time slot memories by the peripheral bus 155. A time slot interchange function is accomplished by the use of the time slot memories and the buffer memories in that data arriving during a certain time slot may be selectively read from the buffer memories in any other time slot.

Figure 3:
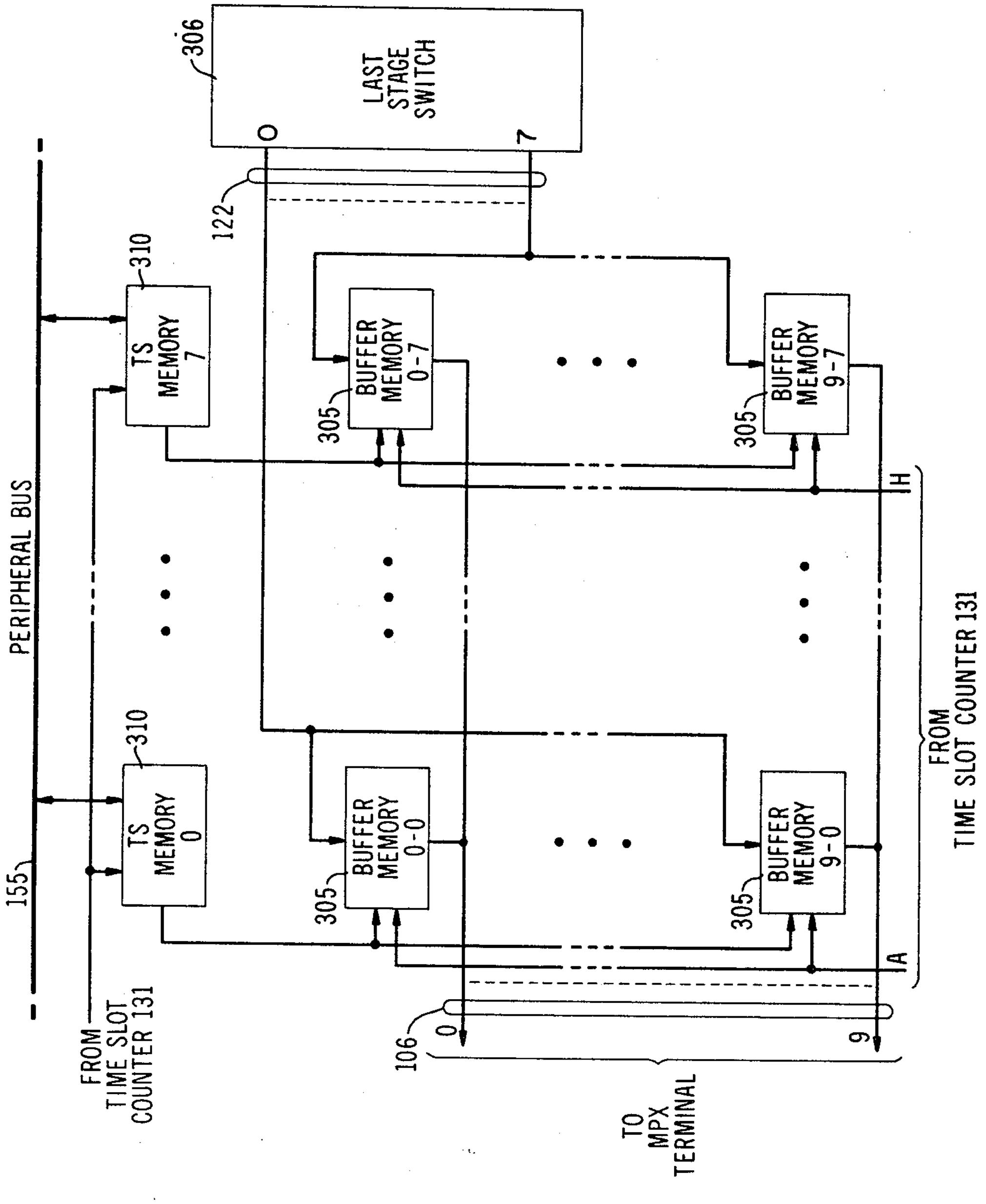

FIG. 3 shows the output section of one of the time slot interchange units 110. FIG. 3 shows a last stage switch 306 of the time-shared network and the elements required to transfer data from eight of the network output ports 122 of the switch to 10 output multiplex lines. Eight output buffer memories 305 are associated with each of the ten output multiplex lines 106 shown in FIG. 3. These memories may be any known memory arrangement which has random write access and from which data words can be read out in sequence. Each of the eight network output ports has access to one memory of each of the ten output multiplex lines. In FIG. 3, the eight network output ports of the last stage switch 306 are labeled 0 through 7, and the 10 output multiplex lines are labeled 0 through 9. Each of the output buffer memories 305 is labeled with a designation *m–n*, where *m* refers to the output multiplex line on which data is to be transmitted from the memory and *n* refers to the output port from which the memory is to receive data. For example, buffer memory 9–7 receives data from output terminal 7 and transmits data to output multiplex line 9. The transfer of data words from the network output ports to the buffer memories 305 is under control of data stored in the time slot memories 310. This information is derived by the central processor 150 and transferred to the time slot memories 310 via the peripheral bus 155. Each memory location of the buffer memories 305 is directly related to a specific channel on the output multiplex line with which the output buffer memory is associated. Thus, the central processor 150, after having determined the channel in which a data word is to be transmitted, must specify the memory location in the buffer memory in which the information is to be stored and must place this information in the proper time slot memory. During each time slot one control word is read from each time slot memory to accomplish the desired data transfers.

Transfer of data words from the buffer memories 305 to the output multiplex lines is under control of pulses occurring on leads A through H. These control pulses are generated by the time slot counter 131, independent of the actions of the central processor 150. Under normal operating conditions the system will not be fully occupied and not every location of the output buffer memories 305 will be used during every time frame. However each location of each of the buffer memories is read once during each time frame and in case a location does not contain meaningful data when it is read, an idle channel code is generated and transmitted on the associated output multiplex line in the corresponding channel.

Described above is an arrangement whereby the traffic from a group of input multiplex lines is distributed over a smaller group of ports, is switched through the network, and distributed from a group of output ports to a larger group of output multiplex lines. It should be apparent from the foregoing that an arragement may also be designed wherein traffic from a group of input multiplex lines is distributed over a larger group of input ports, is switched through the switching network, and is distributed from a group of output ports over a smaller group of output multiplex lines. For example, if it be desired that traffic from a group of seven input multiplex lines be distributed over eight input ports, each input line would be given access to eight input buffer memories. The incoming data from an input line would be distributed to the eight line associated input buffer memories under control of time slot clock pulses, and each input port associated time slot memory would be arranged to transfer data from one memory to each of the seven lines to the associated input port. Similarly, each line of a group of multiplex lines would be given access to eight output buffer memories from which data would be transferred to the output lines under control of time slot clock pulses, and each output port associated time slot memory would transfer data from the associated port to one memory of each of the seven lines.

Figure 4:
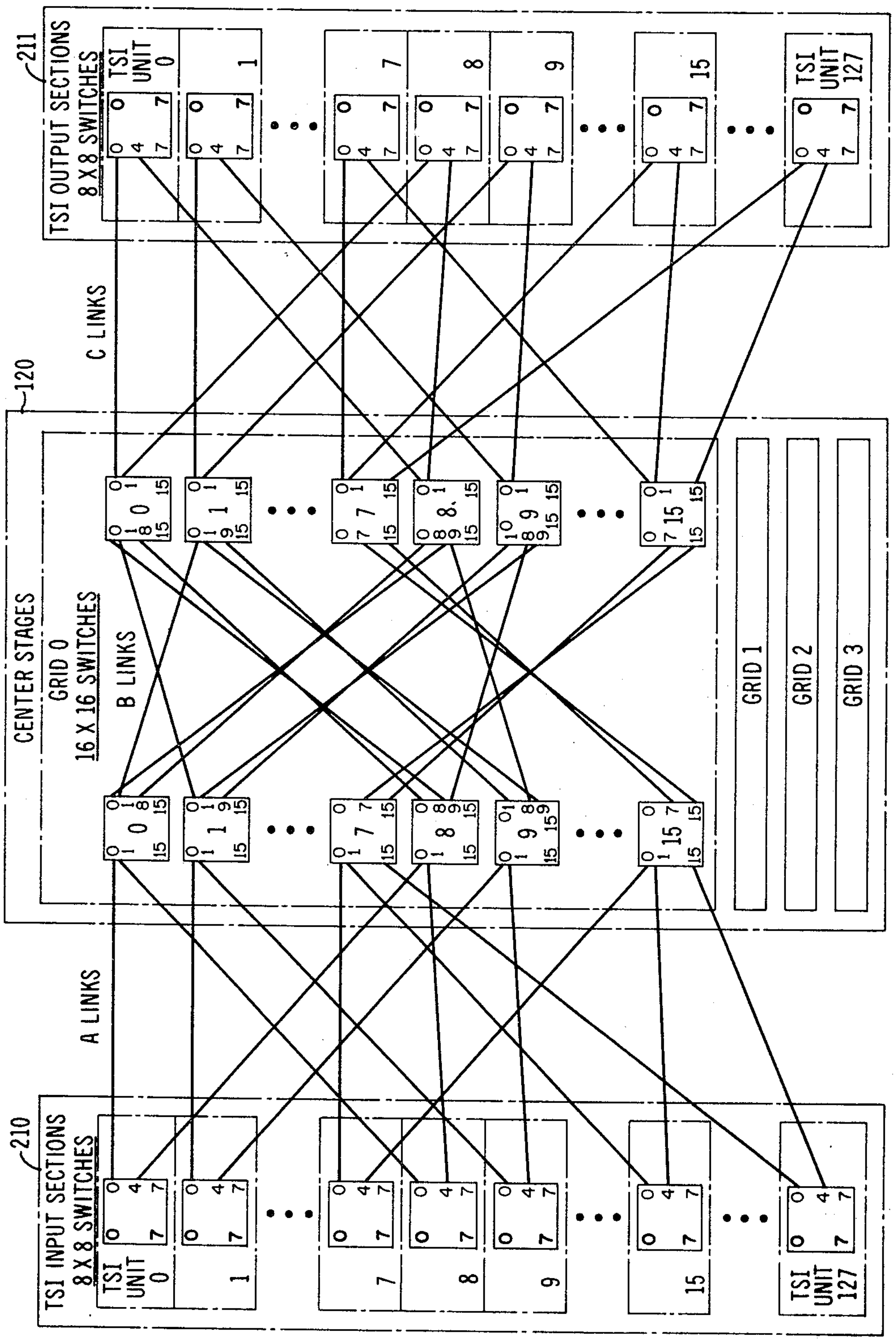
FIG. 4 show a four-stage time-shared space division network used in conjunction with the time slot interchange unit in the illustrative system.

In the illustrative system, data words are transferred from the input section of a time slot interchange unit 110 to the output section of the same or another time slot interchange unit by means of a time division network. The network is controlled from time slot memories which contain memory stored therein by the system's central processor 150. FIG. 4 shows a four-stage time-shared space division network which may be used in conjunction with the time slot interchange units described above. The illustrative network has been made completely symmetrical for reasons to be explained hereinafter. However, it is to be understood that it is not required that a symmetrical network be used in order to practice the invention. In the four-stage network shown in FIG. 4, the link interconnection pattern to the left of an imaginary center line is a mirror image of the interconnection pattern to the right of that center line. Furthermore, there is a direct correspondence between the input ports and output ports of the network. Each voice frequency trunk connected to the system has an incoming air and an outgoing pair connected to one of the multiplex circuits 103 which in turn has an input and an output time division multiplex line connected to one of the time slot interchange units of the system. Each incoming pair is assigned to a unique channel on the input multiplex line and the corresponding outgoing pair is assigned to the same channel on the output multiplex line. Since the transfer pattern, in the time slot units, between the multiplex lines and the network is fixed, it follows that there is an indentifiable input port and output port associated with each channel and, therefore, with each voice frequency trunk connected to the system. The network is time-shared and, therefore, a plurality of channels is associated with each port of the network, but each voice frequency trunk can be associated with only one specific input port and output port. Connections to the network are chosen such that the output port associated with a certain voice trunk is given the same numerical designation as the input port associated with that trunk.

Figure 5:
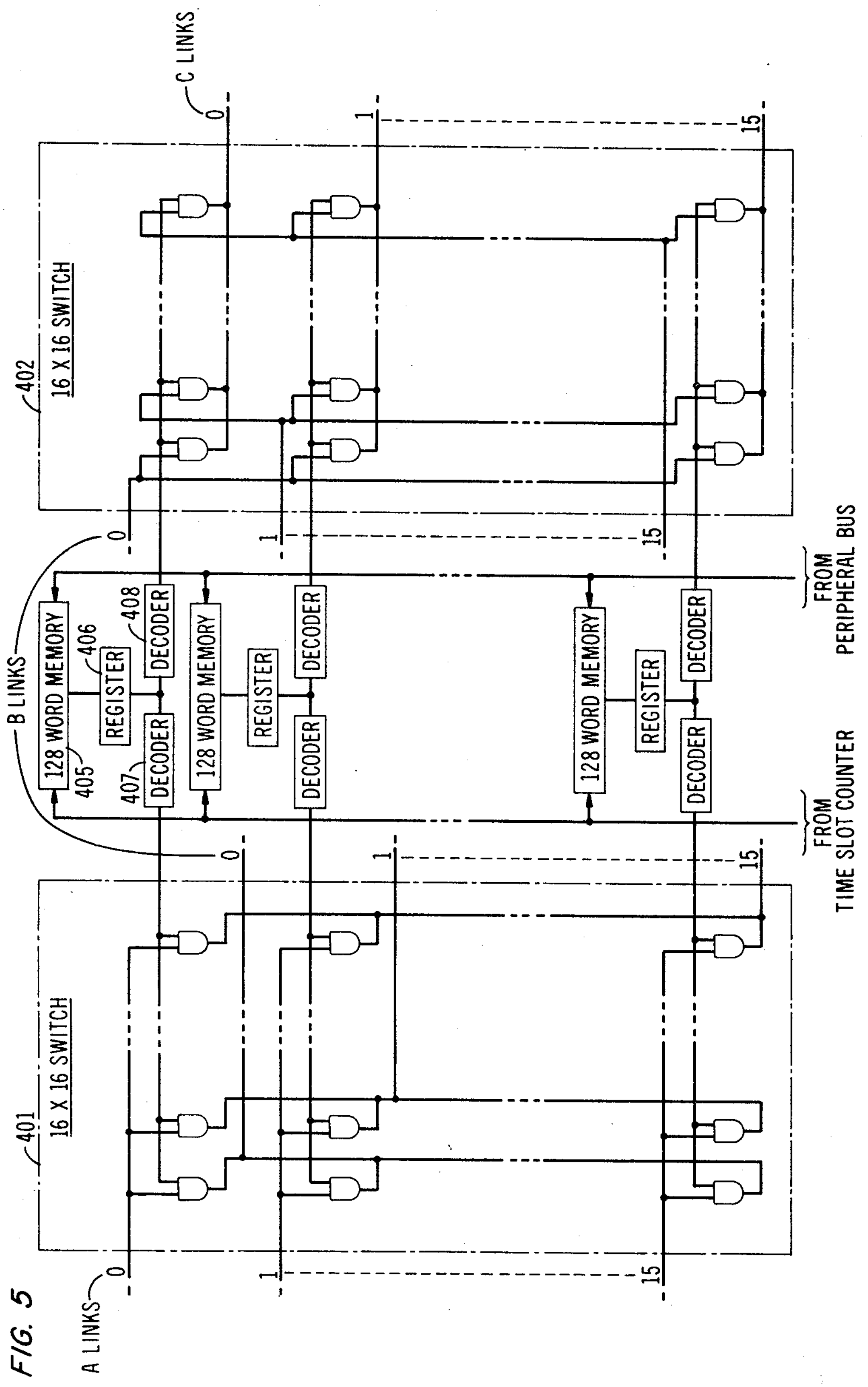
FIG. 5 shows a pair of representative network switches as used in the outer stages of the network, and illustrates the control of the center stages.

The symmetrical nature of the illustrative network brings about a significant saving of hardware and processor real time. As explained earlier herein, the central processor 150 must hunt for an idle path in the network before a network path can be established. In order to facilitate this path hunt, the central processor 150 maintains a record of the busy and idle status of the links of the network. As shown in FIG. 4, the links interconnecting the first and second stages of the network are identified as A links, those interconnecting the second and third stages are identified as B links, and those interconnecting the third and fourth stages are identified as C links. In order to find two complete idle paths, the processor would have to find two idle A links, two idle B links, and two idle C links. By using a symmetrical network and complementary paths the processor needs to find only one idle A link, one idle B link, and one idle C link. Having found these three idle links no further search is needed since it is certain that the corresponding mirror image links are also idle. As a consequence the processor needs less memory space for storing link busy-idle information and requires less processor real time to perform the path hunt. Having determined the links to be employed the processor must then compute the information for controlling the first, second, third, and fourth stage switches which interconnect the selected links. Because of the symmetrical nature of the network the interconnections made in the first and fourth stages of the network are complementary and the interconnections made in the second and third stages of the network are complementary. Hence, one control word can be used to control both the first and fourth stage switches and another control word can be used to control the second and third stage switches. Consequently, less processor real time is required to generate control words. Furthermore, it is possible to only use one time slot memory to simultaneously control a set of second stage switches and a corresponding set of third stage switches. The control of the two center stage switches is illustrated in FIG. 5.

It is to be understood that the above-described arrangement is merely illustrative of the application of the principles of the invention, and that other arrangements may be devised by those skilled in the art without departing from the spirit and scope of the invention. The illustrative toll telephone system described above comprises circuits for analog-to-digital and digital-to-analog conversion. It is, of course, understood that the invention has equal utility in systems having only digital lines connected thereto.

What is claimed is:

1. A communication switching system comprising:

a plurality of input time division multiplex lines, a plurality of output time division multiplex lines, a switching network comprising a plurality of input terminals, a plurality of output terminals and network control means responsive to control signals for selectively interconnecting said input terminals and said output terminals;

a plurality of input buffer memories, said plurality comprising at least one buffer memory for each of said input terminals and individually associated therewith;

input transfer means for establishing trans-mission paths for transferring and distributing data words received from said input time division multiplex lines to said buffer memories in accordance with a fixed first distribution plan, the data words of a series of words from each multiplex line being distributed to and stored in the buffer memories of all of said input terminals in a pre-scribed sequence; means for selectively transmitting data words stored in said input buffer memories to said associated input terminals, means for generating said network control signals; and output transfer means for transferring data words from selected ones of said output terminals to selected ones of said output multiplex lines.

2. A communication switching system in accordance with claim 1 wherein said plurality of input time division multiplex lines are numbered 1 through *m* said plurality of input terminals are numbered 1 through *n* and wherein said plurality of buffer memories comprises *m* times *n* buffer memories.

3. A communication switching system in accordance with claim 1 wherein said second transfer means comprises:

a plurality of output buffer memories, said plurality comprising at least one output buffer memory for each of said output terminals and individually associated therewith, and network output means for establishing transmission paths for transferring data words received from selected ones of said network output terminals to said associated ones of said output buffer memories, and means for establishing transmission paths for transferring and distributing data words stored in said output buffer memories to said output multiplex lines in accordance with a fixed second distribution plan, said second distribution plan being complementary to said first distribution plan.

4. A communication switching system in accordance with claim 1 wherein the system further comprises clock means for generating a chain of clock pulses representing time slots, and wherein said first transfer means responds to each successive time slot clock pulse generated by said clock means to establish a plurality of paths equal in number to the number of said input time division multiplex lines to simultaneously transfer one data word if present from each of said plurality of input lines.

5. A communication switching system comprising:

a plurality of input time division multiplex lines, a plurality of output time division multiplex lines, a switching network comprising a plurality of input terminals, a plurality of output terminals and a network control which responds to control signals to selectively interconnect the input terminals and the output terminals; a plurality of buffer memories comprising at least one buffer memory for each of the input terminals and individually associated with the input terminals; an input circuit arrangement for selectively transmitting data words stored in the buffer memories to the associated input terminals, a control circuit arrangement for generating the network control signals;

CHARACTERIZED IN THAT:

the switching system further comprises an input transfer circuit arrangement for establishing transmission paths for transferring and distributing data words received from the input time division multiplex lines to the buffer memories in accordance with a fixed first distribution plan, the data words of a series of words from each multiplex line being distributed to and stored in the buffer memories of all of the input terminals in a prescribed sequence; and a second transfer circuit arrangement for transferring data words from selected ones of the output terminals to selected ones of the output multiplex lines.

6. A communication switching system comprising:

a plurality of input time division multiplex lines, a plurality of output time division multiplex lines, a switching network comprising a plurality of input terminals, a plurality of output terminals and network control means responsive to control signals for selectively interconnecting said input terminals and said output terminals;

a plurality of input buffer memories, said plurality comprising at least one buffer memory for each of said input terminals and individually associated with said input terminals;

input transfer means for establishing transmission paths for transferring and distributing data words received from said input time division multiplex lines to said buffer memories in accordance with a fixed first distribution plan, the data words of a seires of words from each multiplex line being distributed to and stored in the buffer memories of all of said input terminals in a prescribed sequence;

means for selectively transmitting data words stored in said input buffer memories to said associated input terminals, a plurality of output buffer memories, said plurality comprising at least one output buffer memory for each of said output terminals and individually associated with said output terminals, and network output means for establishing transmission paths for transferring data words received from selected ones of said network output terminals to the said associated ones of said output buffer memories; and output transfer means for establishing transmission paths for transferring and distributing data words stored in said output buffer memories to said output multiplex lines in accordance with a fixed second distribution plan, said second distribution plan being complementary to said first distribution plan; and means for generating said network control signals.

* * * * *